(No Model.)
P. LEEN.
CAR BRAKE.
No. 523,219. Patented July 17, 1894.
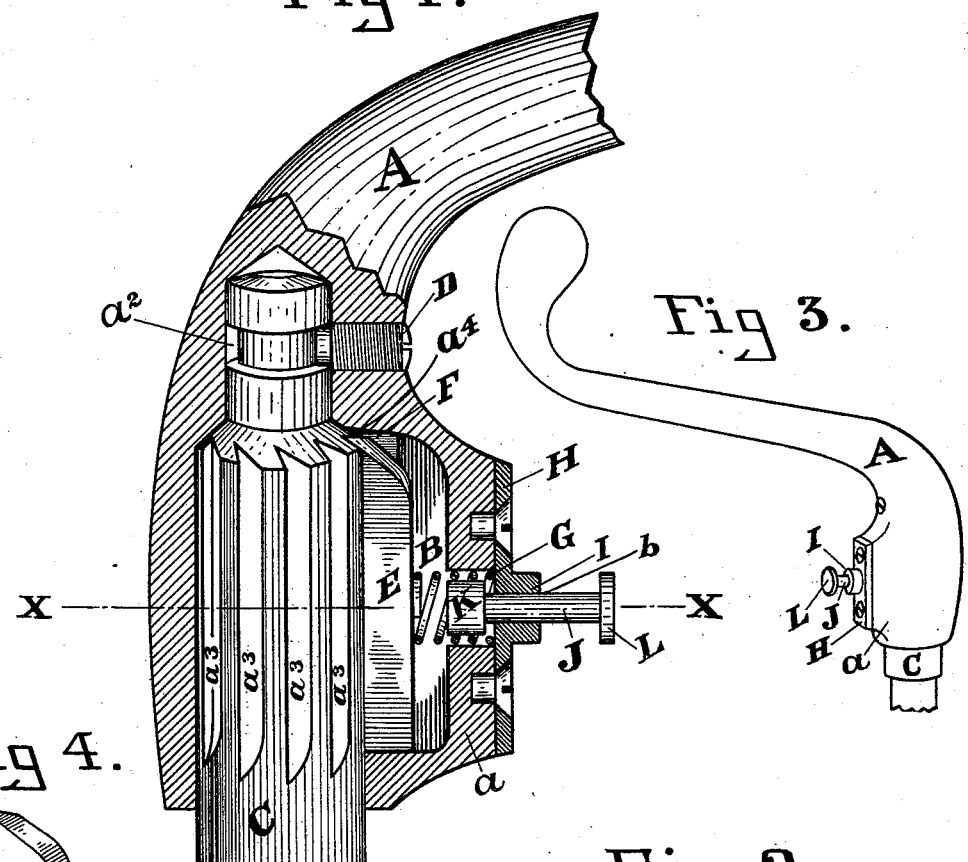
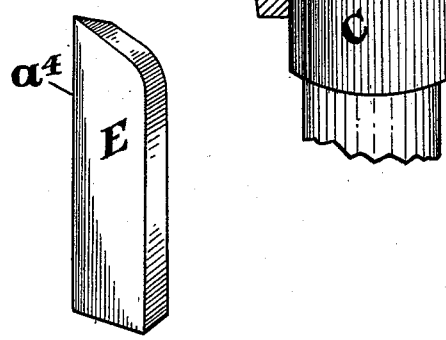
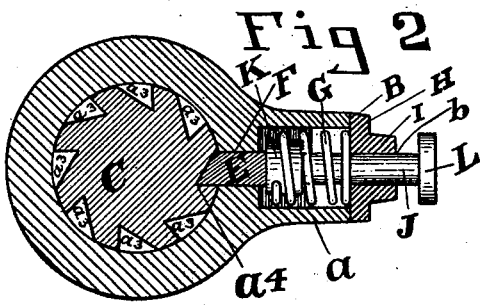
Attest:
E. B. Lehman
H. J. Miller
Inventor.
Patrick Leen

UNITED STATES PATENT OFFICE.

PATRICK LEEN, OF CINCINNATI, ASSIGNOR TO THE DAYTON MANUFACTURING COMPANY, OF DAYTON, OHIO.

CAR-BRAKE.

SPECIFICATION forming part of Letters Patent No. 523,219, dated July 17, 1894.

Application filed February 14, 1894. Serial No. 500,126. (No model.)

*To all whom it may concern:*

Be it known that I, PATRICK LEEN, a citizen of the United States, residing at Cincinnati, in the State of Ohio, have invented a new and useful Improvement in Brake-Handles, of which the following is a specification.

My invention relates to an improvement in brake-handles of that class in which a dog placed in the handle is adapted to automatically engage with a fluted brake-shaft on rotating the handle in one direction, and to be disengaged from the shaft by the rotation of the handle in the opposite direction; and it has for its object the production of an auxiliary device for causing positive engagement of the dog with the flutes on the shaft in the event the automatic means for that purpose should fail.

The invention consists of a novel, simple, and efficient means for accomplishing the desired result, and will be hereinafter fully described and claimed.

Figure 1 represents a partial vertical section of the brake-handle shown and described in United States Patent No. 464,100, to which my improvement is particularly adapted and in connection with which it is shown. Fig. 2 is a cross-section of the same taken on the line X X Fig. 1, showing the position of my auxiliary safety appliance when brought into use. Fig. 3 is a reduced perspective view of the same. Fig. 4 is a perspective view of the dog.

A is the brake-handle, having a shaft-socket in its lower end, and provided with a lateral extension $a$, in which is formed a chamber B.

C is a vertical brake-shaft upon which the handle is mounted, said shaft being formed with an annular groove $a^2$ near its upper end, it being locked in position by means of a set-screw D, which passes through the handle and engages the groove, as shown in Fig. 1. The upper end of the shaft C is fluted, the flutes $a^3$ being preferably about two inches in length, their edges forming ratchet-shaped teeth, as shown in Fig. 2.

E is a dog of substantially the same length as the flutes on the shaft, and having a beveled edge $a^4$, which is adapted to engage the flutes and thereby serve to prevent the handle turning on the shaft when rotated in one direction, and to be forced out of engagement with the flutes by riding over them when the handle is rotated in the opposite direction. This dog operates in and is supported by the walls of a channel F leading from chamber B to the shaft-socket. A coiled spring G, located in chamber B and bearing on the outer edges of the dog E, serves to automatically force the dog into engagement with the flutes.

To the extension $a$ and covering the opening through which the spring is inserted is detachably secured a plate H, which is provided with a boss I, through which is formed an aperture $b$.

J is a push-pin inserted through the aperture $b$ in plate H, and adapted to be moved freely therein. It is provided at its inner end with an enlarged head K and at its outer end with a push-piece L. Around the head K of the push-pin is loosely coiled the spring G before mentioned, so that the pin can be moved independently of it, whereby when from any cause the dog should fail to be automatically operated by the spring the brakeman, by simply pressing against the push-pin, can cause the dog to engage with the flutes, and thereby control the brakes.

Having thus described my invention, what I claim as new, and desire to secure by Letters Patent, is—

1. The combination, with a fluted brake-shaft and a handle mounted thereon, of a spring-actuated dog located within the handle and adapted to engage with the flutes of the brake-shaft, and means independent of the actuating-spring and separate from the dog for causing the latter to engage with said flutes.

2. The combination, with a fluted brake-shaft and a handle mounted thereon, of a spring-actuated dog located within the handle and adapted to engage with the flutes of the brake-shaft, and a push-pin independent of the actuating-spring and separate from the dog mounted in the handle and adapted to force the dog into engagement with the flutes on the shaft.

3. The combination, with a fluted brake-shaft and a handle mounted thereon, of a dog located in the handle and adapted to engage with the flutes on the shaft, a push-pin mounted in the handle and adapted to be moved into contact with the dog, and a spring coiled loosely around the inner end of the push-pin and bearing against the dog, whereby the dog may be operated independently of the spring.

PATRICK LEEN.

Witnesses:
 A. N. STUMP,
 EDWARD KLINE.